United States Patent [19]
Shirasaki

[11] Patent Number: 5,982,488
[45] Date of Patent: Nov. 9, 1999

[54] COMPENSATOR WHICH EXPERIENCES THERMAL EXPANSION TO COMPENSATE FOR CHANGES IN OPTICAL DISTANCE THROUGH A TRANSPARENT MATERIAL

[75] Inventor: Masataka Shirasaki, Winchester, Mass.

[73] Assignee: Fujitsu Limited, Kawasaki, Japan

[21] Appl. No.: 08/806,856

[22] Filed: Feb. 26, 1997

[30] Foreign Application Priority Data

Mar. 22, 1996 [JP] Japan .................................... 8-066717

[51] Int. Cl.⁶ ...................................................... G01B 9/02
[52] U.S. Cl. .......................................... 356/352; 356/345
[58] Field of Search ................................... 356/352, 345; 359/291, 294, 295

[56] References Cited

U.S. PATENT DOCUMENTS 5,059,026  10/1991  Zoechbauer ............................. 356/352
5,289,552   2/1994  Miller et al. ............................ 356/352
5,321,539   6/1994  Hirabayashi et al. ................... 356/352

OTHER PUBLICATIONS

M. Shirasaki, Large Angular–Dispersion By Virtually–Images Phased–Array (VIPA) And Its Application To Wavelength Demultiplexing, Presented at MOC'95 (Microoptics Conference), Paper PD3, Oct. 20, 1995, Hiroshima Japan.

M. Shirasaki, *Temperature Independent Interferometer For WDM Filters*, Paper WeD.1.6 ECOC '96 (European Conference on Optical Communication), Sep. 18, 1996.

*Primary Examiner*—Robert H. Kim
*Attorney, Agent, or Firm*—Staas & Halsey

[57] ABSTRACT

An apparatus which includes a transparent material and a compensator. Light travels through the transparent material for an optical distance. The compensator is attached to the transparent material and experiences thermal expansion which deforms the transparent material to reduce changes in the optical distance caused by changes in temperature of the transparent material. The optical distance is defined as a product of the refractive index of the transparent material and the physical length of an optical path travelled by the light through the transparent material. Preferably, the compensator reduces changes in the optical distance so that the optical distance is maintained to be approximately constant.

34 Claims, 5 Drawing Sheets

COMPENSATOR WHICH EXPERIENCES THERMAL EXPANSION TO COMPENSATE FOR CHANGES IN OPTICAL DISTANCE THROUGH A TRANSPARENT MATERIAL

CROSS-REFERENCE TO RELATED APPLICATIONS

This application is based on, and claims priority to, Japanese application number 08-66717, filed on Mar. 22, 1996, in Japan, and which is incorporated herein by reference.

BACKGROUND OF THE INVENTION

1. Field of the Invention

The present invention relates to an optical element having a transparent material through which light travels for an optical distance. More specifically, the present invention relates to an optical element having a compensator which deforms the transparent material to reduce changes in the optical distance caused by changes in temperature.

2. Description of the Related Art

Wavelength division multiplexing is used in fiber optic communication systems to transfer a relatively large amount of data at a high speed. More specifically, a plurality of channels, each containing information to be transmitted, is combined into a wavelength division multiplexed light. Each channel is at a different wavelength, and the wavelengths are typically very close to each other along the frequency spectrum.

The wavelength division multiplexed light is then transmitted through a single optical fiber to a receiver. The receiver splits the wavelength division multiplexed light into the individual channels, so that the individual channels can be detected. In this manner, a communication system can transfer a relatively large amount of data over an optical fiber.

Figure 1A:
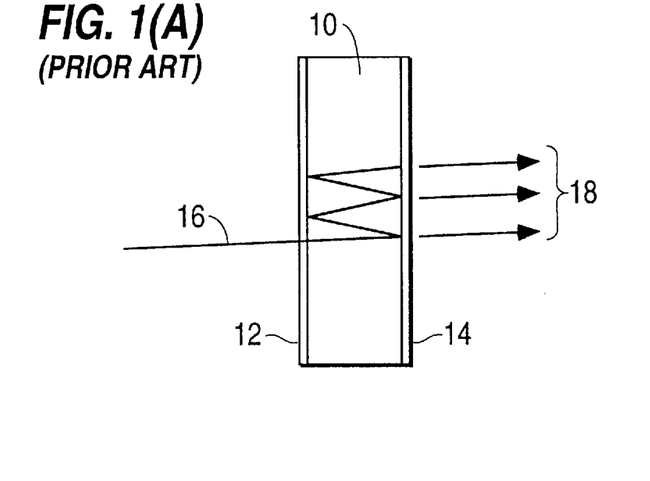
FIG. 1(A) (prior art) is a diagram illustrating a Fabry-Perot etalon interferometer.

FIG. 1(A) is a diagram illustrating a conventional Fabry-Perot etalon interferometer which is typically used to retrieve a single channel from a wavelength division multiplexed light. Referring now to FIG. 1(A), a Fabry-Perot etalon interferometer includes a spacer 10 made of a transparent material and having reflecting films 12 and 14 on opposite sides. The reflectance of reflecting films 12 and 14 are, for example, 95%. Spacer 10 provides stability to the overall structure. However, spacer 10 can typically be omitted, as long as reflecting films 12 and 14 are separated and maintained in parallel with each other.

A collimated light 16 includes lights having different wavelengths and is, for example, a wavelength division multiplexed light. Collimated light 16 enters the Fabry-Perot etalon interferometer and undergoes multiple reflection between reflecting films 12 and 14. Since reflecting film 14 has a reflectance which is less than 100%, the multiple reflection between reflecting films 12 and 14 will cause lights 18 to pass through reflecting film 14.

Moreover, the Fabry-Perot etalon interferometer has strengthening conditions which causes lights 18 to interfere with each other and produce a luminous flux travelling away from reflecting film 14 and including light of a specific wavelength meeting the strengthening conditions. Lights having other wavelengths interfere with each other and thereby weaken each other.

Therefore, the Fabry-Perot etalon interferometer receives collimated light 16 which includes lights having many different wavelengths, and produces a luminous flux which includes only light having a wavelength which meets the strengthening conditions of the Fabry-Perot etalon interferometer. In this manner, a Fabry-Perot etalon interferometer can be used to separate a single channel from a wavelength division multiplexed light.

Since the wavelengths of the channels of a wavelength division multiplexed light are typically very close together, it is important for a Fabry-Perot etalon interferometer to have stable characteristics. The slightest change in characteristics can significantly deteriorate the quality of optical signals transmitted through a fiber optic communication system.

Figure 1B:
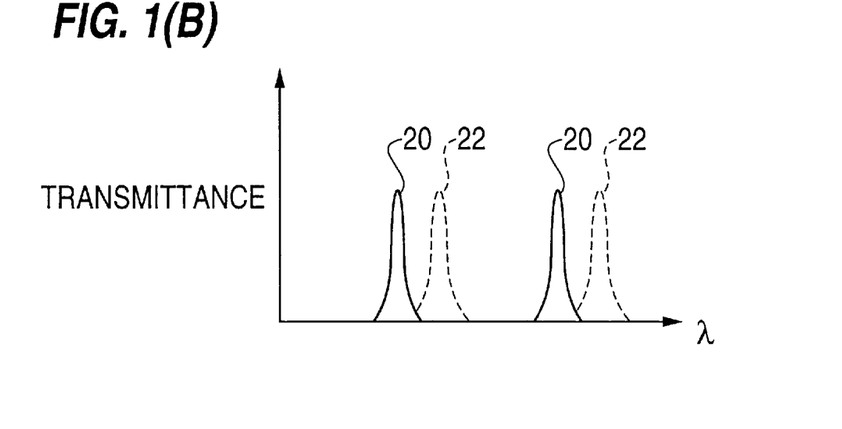
FIG. 1(B) is a graph illustrating a change in transmittance versus wavelength in accordance with a change in temperature, for a Fabry-Perot etalon interferometer.

For example, FIG. 1(B) is a graph illustrating a change in transmittance versus wavelength in accordance with a change in temperature, for a Fabry-Perot etalon interferometer. Referring now to FIG. 1 (B), a Fabry-Perot interferometer passes lights with a wavelength meeting a specified condition, and indicated by curves 20. However, if the temperature of the Fabry-Perot etalon interferometer changes, then the Fabry-Perot etalon interferometer will pass lights with a different wavelength, as indicated by curves 22. Therefore, the wavelength of light output from a Fabry-Perot etalon interferometer will undesireably change in accordance with a change in temperature.

Figure 1C:
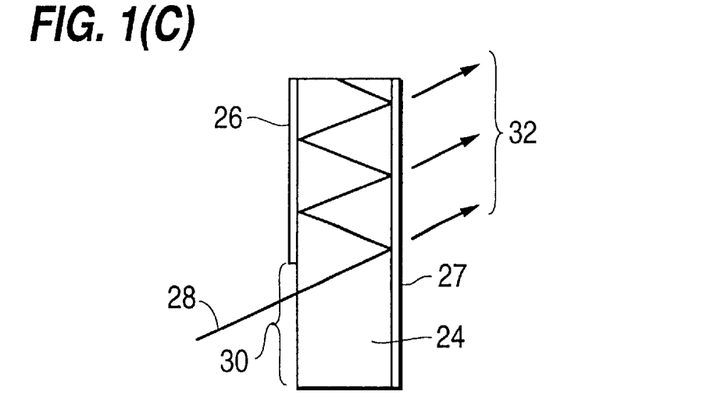
FIG. 1(C) is a diagram illustrating a virtually imaged phased array (VIPA).

A similar problem occurs in a device as illustrated in FIG. 1(C). More specifically, FIG. 1(C) is a diagram illustrating a virtually imaged phased array (VIPA). A VIPA is more fully disclosed in U.S. patent application titled "VIRTUALLY IMAGED PHASED ARRAY AS A WAVELENGTH DEMULTIPLEXER", application Ser. No. 08/685,362, filed Jul. 24, 1996, and which is incorporated herein by reference.

Referring now to FIG. 1(C), a VIPA includes a spacer 24 made of a transparent material. Reflecting films 26 and 27 are provided on opposite sides of spacer 24. The reflectance of reflecting films 26 and 27 are, for example, 100% and 95% respectively. Spacer 24 provides stability to the overall structure. However, spacer 24 can typically be omitted, as long as reflecting films 26 and 27 are separated and maintained in parallel with each other.

Incident light 28 is line-focused to travel through an entrance window 30 and then diverges in spacer 24 so that multiple reflection occurs between reflecting films 26 and 27. Since reflecting film 27 has a reflectance which is less than 100%, the multiple reflection between reflecting films 26 and 27 will cause lights 32 to pass through reflecting film 27. Lights 32 interfere with each other to form collimated light for each wavelength in incident light 28, where each collimated light travels in a different propagating direction than the other collimated lights.

More specifically, the VIPA can receive incident light 28 which includes many wavelengths, and produce a different luminous flux for each wavelength. Each luminous flux has a different angle of propagation from the VIPA and is therefore spatially distinguishable from the other luminous fluxes. Therefore, the VIPA can receive a wavelength division multiplexed light which includes many channels, and produce a spatially distinguishable luminous flux for each channel. A VIPA can be used, for example, as a demultiplexer in an optical fiber communication system which uses wavelength division multiplexing.

A VIPA experiences problems similar to that illustrated in FIG. 1(B) for a Fabry-Perot etalon interferometer. More specifically, a VIPA can undesireably produce a luminous flux having a different wavelength, depending on changes in temperature of the VIPA.

Therefore, the characteristics of a Fabry-Perot etalon interferometer and a VIPA undesireably change as the temperature changes. These characteristic changes are due to the thermal expansion of the spacers used in a Fabry-Perot etalon interferometer and a VIPA. For example, if spacer 10 of the Fabry-Perot etalon interferometer illustrated in FIG. 1(A) is expanded, then the physical distance between reflecting films 12 and 14 is also expanded. Further, the refractive index of spacer 10 changes as the temperature changes. This change in the refractive index causes a change in the optical distance between reflecting films 12 and 14, where the optical distance is a product of the physical distance between reflecting films 12 and 14 and the refractive index of spacer 10.

Similarly, if spacer 24 of the VIPA illustrated in FIG. 1(C) is expanded, then the physical distance between reflecting films 26 and 27 is also expanded. Further, the refractive index of spacer 24 changes as the temperature changes. This change in the refractive index causes a change in the optical distance between reflecting films 26 and 27.

As a result of a change in optical distance corresponding to a change in temperature, the characteristics of a Fabry-Perot etalon interferometer and a VIPA can undesireably change. For example, when a typical glass is used as a spacer in a Fabry-Perot etalon interferometer or VIPA, the thickness of the spacer increases by about $5 \times 10^{-6}$ each time the temperature rises by one degree. In addition, the refractive index of the spacer also increases by about $5 \times 10^{-6}$ each time the temperature rises by one degree. Assuming that the wavelength of light is 1500 nm and the temperature rises by 10 degrees, the optical distance will change by a factor of $10^{-4}$ and then will result in a wavelength change of 0.15 nm. This is a significant change which can seriously affect the characteristics of a Fabry-Perot etalon interferometer or VIPA.

SUMMARY OF THE INVENTION

Accordingly, an object of the present invention is to provide an optical element, such as a Fabry-Perot etalon interferometer or VIPA, having characteristics which are stable in relation to temperature changes of the optical element.

Moreover, it is an object of the present invention to provide an optical element through which light travels, and where the optical distance travelled by the light is stable in relation to temperature changes of the optical element.

Additional objects and advantages of the invention will be set forth in part in the description which follows, and, in part, will be obvious from the description, or may be learned by practice of the invention.

The foregoing objects of the present invention are achieved by providing an apparatus which includes a transparent material and a compensator. Light travels through the transparent material for an optical distance. The compensator is attached to the transparent material and experiences thermal expansion which deforms the transparent material to reduce changes in the optical distance caused by changes in temperature of the transparent material. The optical distance is defined as a product of the refractive index of the transparent material and the physical length of an optical path travelled by the light through the transparent material.

Preferably, the compensator reduces changes in the optical distance so that the optical distance is maintained to be approximately constant.

Moreover, objects of the present invention are achieved by providing a transparent material, first and second reflecting surfaces on the transparent material, and a compensator. The transparent material has an optical path extending therein, and the optical path has a physical length. An optical distance is defined as a product of the physical length of the optical path and the refractive index of the transparent material. Light travels from the first reflecting surface and through the transparent material along the optical path to reach the second reflecting surface. The compensator is attached to the transparent material and experiences thermal expansion which deforms the transparent material to reduce changes in the optical distance caused by changes in temperature of the transparent material. More specifically, the compensator deforms the transparent material by stretching the transparent material in directions transverse to the optical path, to thereby reduce the thickness of the transparent material in optical path direction.

Objects of the present invention are also achieved by providing an apparatus which includes first and second transparent layers. Light travels through the first transparent layer for a first optical distance and then travels through the second transparent layer for a second optical distance. The second optical distance changes to compensate for changes in the first optical distance caused by changes in temperature of the first transparent layer, so that the sum of the first and second optical distances remains approximately constant.

Objects of the present invention are also achieved by providing an apparatus which includes first and second bodies. The first body is transparent so that light travels through the first body for an optical distance. The second body interacts with the first body to reduce changes in the optical distance caused by changes in temperature of the first body. The interaction is a mechanical interaction.

In addition, objects of the present invention are achieved by providing a method which includes the steps of (a) causing light to travel through a transparent material for an optical distance; and (b) deforming the transparent material to reduce changes in the optical distance caused by changes in temperature of the transparent material.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 2:
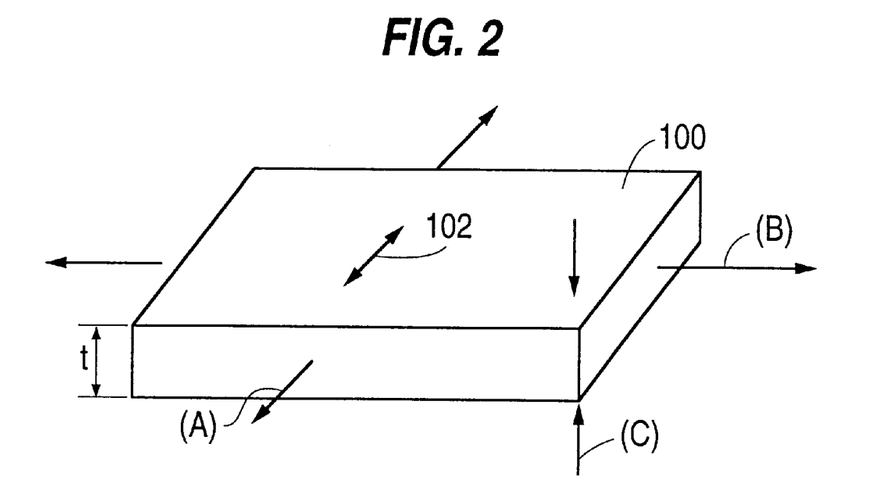
FIG. 2 is a diagram illustrating various forces affecting a Fabry-Perot etalon interferometer or a VIPA, according to an embodiment of the present invention.

FIG. 2 is a diagram illustrating various forces affecting a spacer of a Fabry-Perot etalon interferometer or a VIPA, according to an embodiment of the present invention. Referring now to FIG. 2, a transparent plate 100 is used as a spacer in a Fabry-Perot etalon or a VIPA. Light (not illustrated) travels through transparent plate 100 along an optical path (not illustrated). Thus, transparent plate 100 expands by heat and thereby changes in thickness. As a result of this expansion, the length of the optical path through transparent plate 100 will change.

According to the embodiments of the present invention, a compensator (not illustrated in FIG. 2, but illustrated in other figures discussed further below) is attached to transparent plate 100. The compensator is made of a material different from that of transparent plate 100 and has a larger thermal expansion coefficient than transparent plate 100. Therefore, the expansion of the compensator offsets the change in length of the optical path in transparent plate 100.

For example, assume that a compensator is attached to one or both sides of transparent plate 100, and has a larger thermal expansion coefficient than transparent plate 100. In this case, $\alpha 1$ indicates the thermal expansion coefficient of transparent plate 100, n1 indicates the temperature coefficient (which is an index change $\Delta n$ in refractive index n for one degree temperature change divided by n) of the refractive index of transparent plate 100, $\sigma$ indicates the Poisson ratio (vertical shrinkage of an object when it is expanded dynamically and horizontally in unit length), P1 indicates the parallel component of the strain coefficient of the refractive index of transparent plate 100, and P2 indicates the vertical, or perpendicular, component of the strain coefficient of the refractive index of transparent plate 100.

The parallel component P1 of the strain coefficient of the refractive index indicates the change ratio of the refractive index when strain is applied parallel to the optical polarization of light travelling through transparent plate 100. The perpendicular component P2 of the strain coefficient of the refractive index indicates the change ratio of the refractive index when strain is applied perpendicular to the optical polarization of light travelling through transparent plate 100. The thermal expansion coefficient of the compensator closely attached to the transparent plate 100 is represented by $\alpha 2$.

Moreover, as previously described, the characteristic change of a Fabry-Perot etalon interferometer and a VIPA is a change in optical distance caused by the expansion of transparent plate 100. Therefore, the optical distance should be maintained to be constant. Assuming that the thickness of transparent plate 100 shown in FIG. 2 is t and the refractive index of transparent plate 100 is n, the optical distance equals nt. Therefore, if the change rate $\Delta(nt)/nt$ of nt generated with the temperature change is set to approximately zero, the change in optical distance can be set to approximately zero.

The change rate $\Delta(nt)/nt$ of nt generated with the temperature change is represented as follows.

$$\frac{\Delta(nt)}{nt} = \frac{\{(n+\Delta n)\cdot(t+\Delta t) - nt\}}{nt} \qquad \text{Equation (1)}$$
$$= \frac{\Delta n}{n} + \frac{\Delta t}{t} + \frac{\Delta n \cdot \Delta t}{nt}$$
$$= \frac{\Delta n}{n} + \frac{\Delta t}{t} + \left(\because \frac{\Delta n \cdot \Delta t}{nt} = 0\right)$$

Therefore, the change rate $\Delta(nt)/nt$ of nt generated with the temperature change is obtained by adding the change rate of the refractive index to the change rate of the thickness of transparent plate 100.

When the temperature rises by one degree, each value changes as follows. The change ratio of the product nt of the thickness and refractive index of transparent plate 100 when a compensator is not provided is $\alpha 1+n1$.

Next obtained is the amount of the change in the product nt of the thickness and refractive index after transparent plate 100 is pulled in the transversal directions by the compensator.

If transparent plate 100 is excessively expanded in the transversal directions by the expansion of the compensator, the amount of expansion is represented by $\alpha 2-\alpha 1$. Therefore, an amount of reduction of thickness of transparent plate 100 is represented by $\sigma 0 (\alpha 2-\alpha 1)$, where $\sigma 0=2\sigma/(1-\sigma)$. The value $\sigma 0$ is obtained in consideration that transparent plate 100 is expanded in two dimensions, and is represented by a sum of indefinite geometric series. The coefficient "2" indicates that transparent plate 100 is bi-directionally expanded in two dimensions.

Next obtained is the change rate of the refractive index of transparent plate 100 expanded by the compensator.

Referring now to FIG. 2, the polarization of light travelling through transparent plate 100 is as shown by arrow 102. Since the direction (A) is the same as the polarization 102 of the light, the change ratio of the refractive index through the expansion in the direction (A) is $-P1(\alpha 2-\alpha 1)$.

The direction (B) is vertical, or perpendicular, to the polarization 102 of the light travelling through transparent plate 100. Therefore, the change ratio of the refractive index through the expansion in the direction (B) is represented by $-P2 (\alpha 2-\alpha 1)$.

Furthermore, the direction (C) is vertical, or perpendicular, to the polarization 102 of the light travelling through transparent plate 100. Therefore, the change ratio of the refractive index through the shrinkage in the direction (C) is represented by $P2(\alpha 2-\alpha 1)\sigma 0$. The multiplication by $\sigma 0$ represents the consideration of the thickness shrinkage in response to the expansion in two dimensions in the directions (A) and (B).

Since P1 and P2 are defined as shrinkage coefficients, the expansions in the directions (A) and (B) are assigned minus signs while the shrinkage in the direction (C) is assigned a plus sign.

Since the total amount of change can be separately obtained according to the change rate of refractive index and the change rate of thickness, each value is added to obtain the change rate $\Delta(nt)/nt$ of the optical distance of the transparent plate 100 by Equation (1), above, as follows.

$$\frac{\Delta(nt)}{nt} = \alpha 1 + n1 - (\alpha 2 - \alpha 1) \times (\sigma 0 + P1 + P2 \times (1 - \sigma 0)) \quad \text{Equation (2)}$$

If Equation (2), above, is approximately zero, the optical distance of transparent plate 100 does not change with the temperature change. Therefore, an optical element using transparent plate 100 will have characteristics which are independent of temperature changes. That is, the optical element can be free of change in characteristics even when the temperature rises by selecting materials for transparent plate 100 and an attached compensator so that Equation (2) is approximately zero.

For example, assume that the thermal expansion coefficient of the compensator is $\alpha 2 = 14 \times 10^{-6}$, the thermal expansion coefficient of the transparent plate 100 is $\alpha 1 = 5.9 \times 10^{-6}$, the Poisson ratio is $\sigma = 0.293$, and the temperature coefficient of the refractive index is $n1 = 2.1 \times 10^{-6}$. In this example, Equation (2) can be calculated as follows.

$$1.3 \times 10^{-6} - (P1 + 0.2 \times P2) \times 8 \times 10^{-6} \quad \text{Equation (3)}$$

If P1 and P2 are approximately 0.14, the expression is approximately zero. Therefore, an optical glass can be selected which provides appropriate values close to the above-described example. Moreover, the above described example is only intended as an example, and the present invention is not intended to be limited to any specific example or material. Many other materials can be used as long as the materials satisfy Equation (2).

Various optical glasses indicate the thermal expansion coefficient of $5 \sim 14 \times 10^{-6}$ (an exception is fused quartz having a thermal expansion coefficient of $0.5 \times 10^{-6}$), the Poisson ratio of 0.2~0.3 (an exception is fused quartz having a Poisson ratio of 0.05), the temperature coefficient of the refractive index of 1~approximately $5 \times 10^{-6}$, and the parallel and vertical (perpendicular) components of the strain coefficient of the refractive index are approximately 0.1~0.3.

Therefore, the above described numerical examples can be applicable by selecting optical glass. Even if the numerical examples do not match the values of the parameters, an optical element independent of the temperature can be obtained by selecting a material that sets Equation (2) to approximately zero.

Figure 3A:
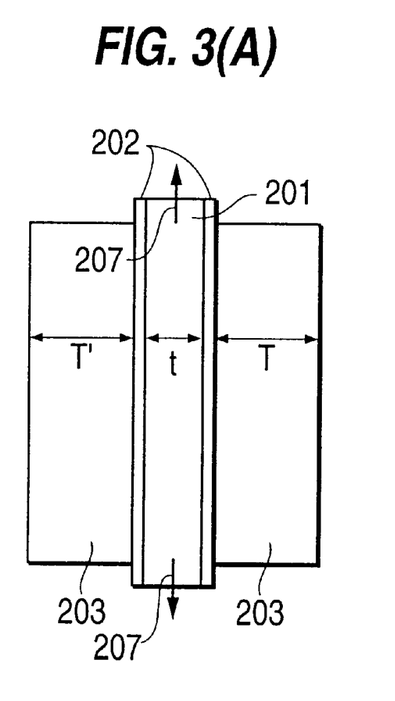
FIG. 3(A) is a diagram illustrating a Fabry-Perot etalon interferometer, according to an embodiment of the present invention.

FIG. 3(A) is a diagram illustrating a Fabry-Perot etalon interferometer, according to an embodiment of the present invention. Referring now to FIG. 3 (A), optical glasses having the above described parameters are used as a transparent plate 201 and a compensator 203. For example, a Fabry-Perot etalon comprises a transparent plate 201 and reflecting films 202. A compensator 203 is attached to the sides of transparent plate 201 on which reflecting films 202 are applied. Compensator 203 is made of a transparent material.

Transparent plate 201 expands and becomes thicker with the refractive index n increasing as the temperature rises. However, since compensator 203 expands more than transparent plate 201, transparent plate 201 is mechanically pulled outward, as indicated by arrows 207, and becomes thinner. This outward pulling of transparent plate 201 offsets the increase of the product of the thickness t and the refractive index n, thereby successfully maintaining the optical distance to be constant.

The thickness t is approximately 50~100 μm. The thicknesses T and T' of compensators 203 are not necessarily equal to each other, but it is desired to have equal-thickness compensators of, for example, 2 mm in thickness. The thickness T and T' of compensator 203 should be much larger than the thickness t of transparent plate 201, to prevent compensators 203 from suppression of expansion when transparent plate 201 is pulled by compensator 203. If the shrinkage of transparent plate 201 overcomes the tensile strength of compensator 203, then transparent plate 201 cannot be pulled and the optical distance cannot be maintained constant.

Therefore, to maintain the optical distance constant in response to temperature changes, compensator 203 should be thicker than transparent plate 201. However, an appropriate output pulling of transparent plate 201 can be obtained as long as compensator 203 is, for example, at least five (5) times as thick as transparent plate 201. Preferably, compensators 203 should be ten (10) to twenty (20) times as thick as transparent plate 201.

Compensators 203 are commonly attached onto reflecting films 202 using an adhesive agent, but can also be attached without an adhesive agent by evenly grinding the surfaces of reflecting films 202 and compensators 203 to obtain the optical flat. If surfaces of the optical flats are attached to each other, no clearance is made between the surfaces as if they were connected using an adhesive agent. As a result, no adhesive agents are required.

Even if a compensator is not provided on both sides of transparent plate 201, the same effect can be obtained by providing a compensator on only one side of transparent plate 201.

Figure 3B:
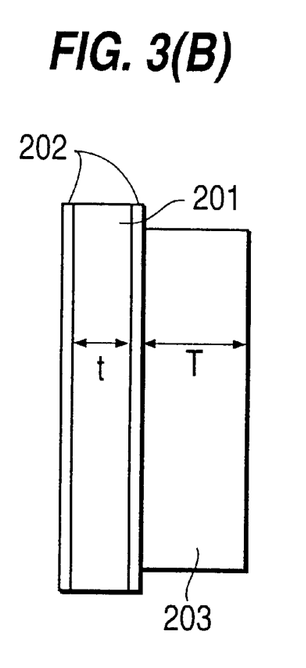
FIG. 3(B) is a diagram illustrating a Fabry-Perot etalon interferometer, according to an embodiment of the present invention.

For example, FIG. 3(B) is a diagram illustrating a Fabry-Perot etalon interferometer, according to an embodiment of the present invention. Referring now to FIG. 3(B), a compensator 203 is provided on only one side of the Fabry-Perot etalon interferometer. In this case, the thickness t of transparent plate 201 is smaller than the thickness T of compensator 203, and T is preferably equal to or larger than five (5) times t.

Figure 4A:
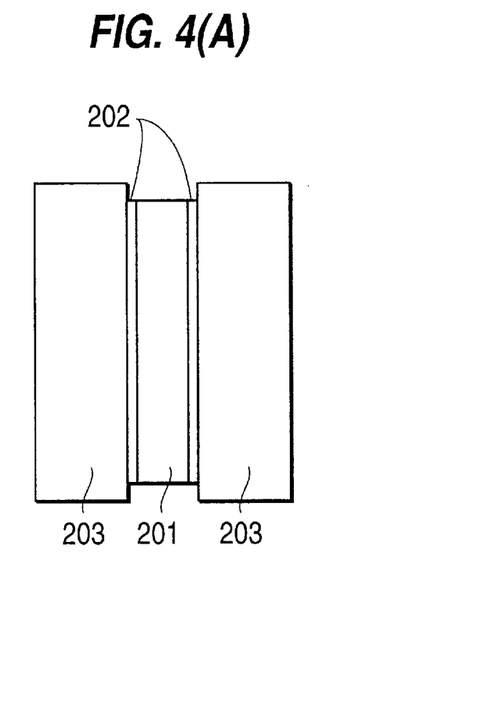
FIG. 4(A) is a diagram illustrating a Fabry-Perot etalon interferometer, according to an additional embodiment of the present invention.

FIG. 4(A) is a diagram illustrating a Fabry-Perot etalon interferometer, according to an additional embodiment of the present invention. Referring now to FIG. 4(A), materials for transparent plate 201 and compensator 203 are selected to satisfy Equation (2), above. Further, compensator 203 is designed to be larger in area than transparent plate 201. Reflecting films 202 are provided on both sides of transparent plate 201 to form a Fabry-Perot etalon interferometer.

In FIG. 4(A), the thickness of transparent plate 201 is commonly 50–100 μm, and the thickness of each compensator 203 is preferably set to be at least five (5) times as thick as transparent plate 201. A preferable thickness for compensator 203 is approximately 2 mm. In FIG. 4(A), compensators 203 are provided on both sides of transparent plate 201. Thus, as the temperature rises, transparent plate 201 is expanded with the expansion of compensators 203.

Since compensators 203 are designed to be larger in area than transparent plate 201, the tensile strength of compensators 203 pulling transparent plate 201 is large enough to obtain the required outward pulling effect.

Figure 4B:
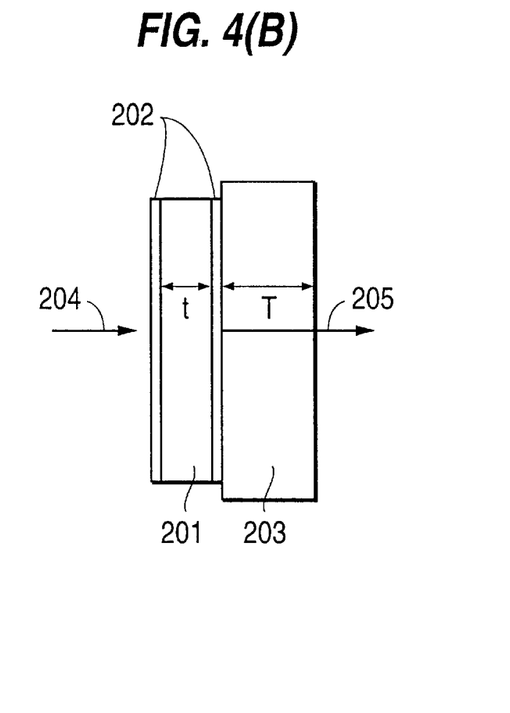
FIG. 4(B) is a diagram illustrating a Fabry-Perot etalon interferometer, according to a further embodiment of the present invention.

FIG. 4(B) is a diagram illustrating a Fabry-Perot etalon interferometer, according to a further embodiment of the present invention. Referring now to FIG. 4(B), compensator 203 is provided on one side of transparent plate 201.

Therefore, tensile strength is applied by compensator 203 to only one side of transparent plate 201. However, since the expansion of transparent plate 100 through thermal expansion is very small, an appropriate pulling effect can be obtain as long as compensator 203 is firmly attached to transparent plate 201 through reflecting film 202.

In this case, the thickness T of compensator 203 is preferably five (5) or more times as large as the thickness t of transparent plate 201. The material of compensator 203 is selected from optical glasses meeting the above-described conditions, or can be an optic-transmissible material having a large thermal expansion coefficient.

For example, referring to FIG. 4(B), an incident light 204 enters through a reflecting film 202, undergoes multiple reflection inside transparent plate 201, and is output as an output light 205. Since output light 205 must pass through compensator 203, planer object 203 should be made of an optic-transmissible material.

In FIGS. 4(A) and 4(B), each planer object 203 has an attaching surface for attaching to a side surface of transparent plate 201. Moreover, the surface area of the attaching surface of each compensator 203 is larger than the surface area of the attached side surface of transparent plate 201. As a result, the tensile strength of each compensator 203 effects the entire attached side surface of transparent plate 201, thereby more efficiently compensating for changes in optical distance caused by changes in temperature.

Figure 5A:
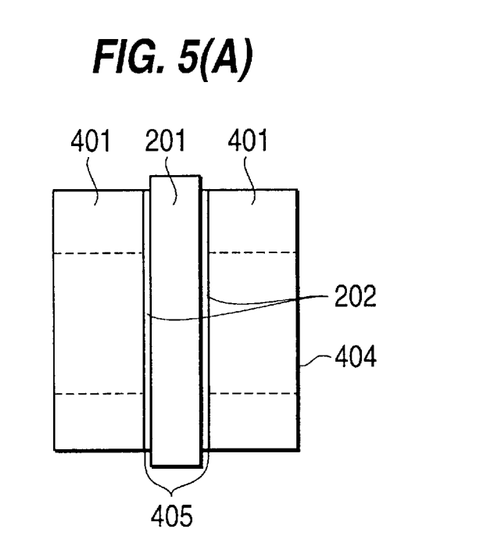
FIGS. 5(A) and 5(B) are diagrams illustrating a Fabry-Perot etalon interferometer, according to an embodiment of the present invention.
Figure 5B:
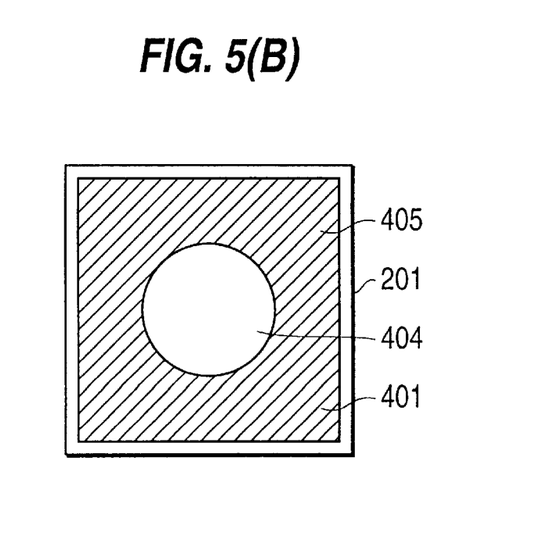

FIGS. 5(A) and 5(B) are diagrams illustrating a Fabry-Perot etalon interferometer, according to an embodiment of the present invention. Referring now to FIGS. 5(A) and 5(B), transparent plate 201 has reflecting films 202 thereon. A transparent compensator 401 is attached through metallic welding to transparent plate 201. Preferably, a thin metallic layer is formed on reflecting film 202 and a thin metallic layer is formed on the plane surface of compensator 401. The thin metallic layers are formed, for example, by evaporation. The metallic film on compensator 401 is soldered to the metallic film on transparent plate 201, thereby soldering compensator 401 to transparent plate 201.

Since a metallic film is not optic-transmissible, an optic entrance 404 is provided in transparent plate 201 to receive light. More specifically, as illustrated in FIG. 5(B), a metallic film 405 is provided on transparent plate 201 excluding optic entrance 404. Optic entrance is preferably at the center of transparent plate 201. When transparent plate 201 is thermally expanded, compensator 401 is also expanded to further pull transparent plate 201 and thereby maintain the optical distance to be constant. If transparent plate 201 and compensator 401 are attached to each other through metallic film 405, then metallic film 405 provides reliable adhesion, as compared to attachment using an adhesive or optical flats.

Therefore, either a metallic film or an adhesive can be used as an adhesive material to attach transparent plate 201 and compensator 401. With this type of adhesive material, optic entrance 404, as shown in FIG. 5(B), should be provided to allow light to pass therethrough. In addition, the adhesive material should not be present in optic entrance 404 so that light is not blocked by the adhesive material. In this case, an adhering material should be applied so that a firm adherence force is provided in the area surrounding optic entrance 404 so that a constant effect of pulling transparent plate 402 by compensator 401 can be maintained. As a result, an optical element that is free of characteristic change by temperature can be generated.

In FIGS. 5(A) and 5(B), compensator 401 is provided on both sides of transparent plate 201. However, similar to that shown in FIGS. 3(B) and 4(B), a compensator 401 can be provided on only one side of transparent plate 201. In such a case, compensator 401 is provided with optic entrance 404. If a metallic film or an opaque adhesive is used as an adhesive material, the metallic film or opaque adhesive should be applied to compensator 401 and/or transparent plate 201 so that no adhesive material exists in optic entrance 404. Further, in FIG. 5(B), optic entrance 404 is circular shaped. However, optic entrance 404 is not intended to be limited to any particular shape.

Figure 6A:
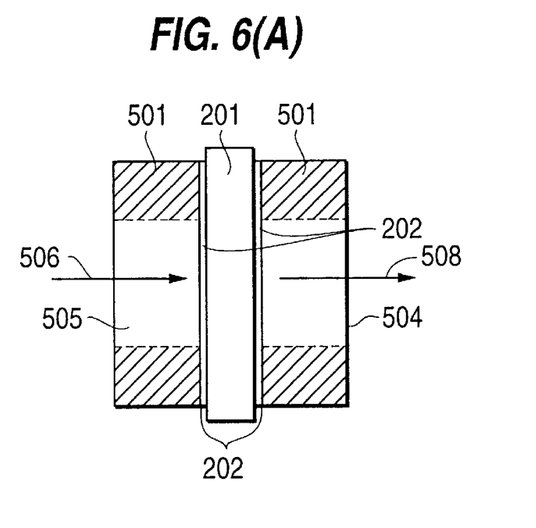
FIGS. 6(A) and 6(B) are diagrams illustrating a Fabry-Perot etalon interferometer, according to an embodiment of the present invention.
Figure 6B:
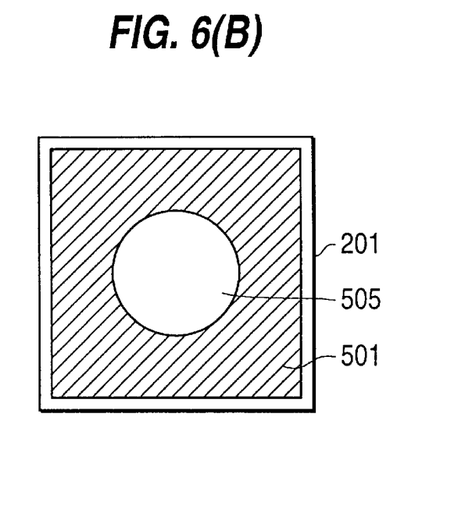

FIGS. 6(A) and 6(B) are diagrams illustrating a Fabry-Perot etalon interferometer, according to an embodiment of the present invention. The configuration shown in FIGS. 6(A) and 6(B) is basically the same as that shown in FIGS. 5(A) and 5(B). However, in FIGS. 6(A) and 6(B), opaque compensators 501 (as opposed to a transparent compensator) are attached to transparent plate 201. Compensators 501 have a larger thermal expansion coefficient than transparent plate 201, and are attached to both sides of transparent plate 201.

Since compensator 501 is opaque, an optic exit 504 and an optic entrance 505 are provided to introduce a light into transparent plate 201. Optic entrance 505 and optic exit 504 are preferably formed by making a hole in compensator 501.

Optic entrance 505 and optic exit 504 reduce the surface area between transparent plate 201 and compensators 201 to which an adhesive material can be applied. However, compensator 501 is preferably five (5) or more times as thick as transparent plate 201, so that an appropriate pulling effect on transparent plate 201 can be obtained.

Although FIG. 6(B) illustrates optic entrance 505 as being circular, an optical entrance is not intended to be limited to any particular shape.

Further, in FIGS. 6(A) and 6(B) compensator 501 is illustrated as being smaller in length than transparent plate 201. However, compensator 501 can be larger in length than transparent plate 201.

Figure 7A:
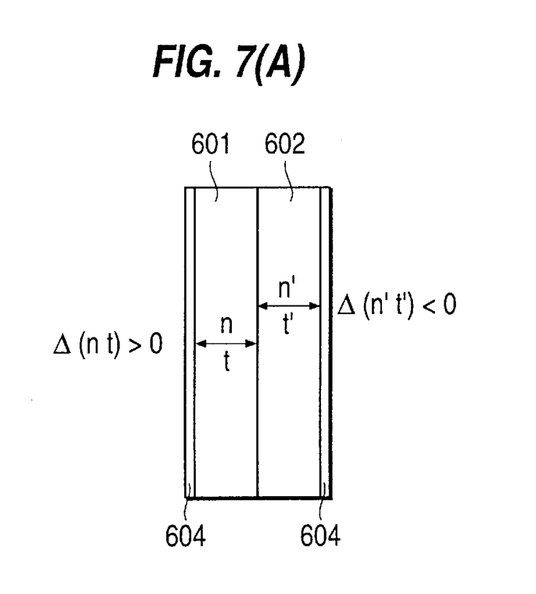
FIG. 7(A) is a diagram illustrating a Fabry-Perot etalon interferometer, according to an additional embodiment of the present invention.

FIG. 7(A) is a diagram illustrating a Fabry-Perot etalon interferometer, according to an additional embodiment of the present invention. Referring now to FIG. 7(A), two transparent plates 601 and 602 are laminated together. A reflecting film 604 is applied to one side of transparent plate 601, and a reflecting film 604 is applied to one side of transparent plate 602, to form a Fabry-Perot etalon interferometer.

Transparent plate 601 is made of a material that positively changes in optical distance with the temperature rise, and transparent plate 602 is made of a material that negatively changes in optical distance with the temperature rise. The optical distance through each transparent plate 601 and 602 is represented approximately by the product of the thickness and the refractive index of the respective transparent plate. Therefore, a change in the total optical distance by a change in temperature is offset between transparent plates 601 and 602, so that the characteristics of the entire thin plate (that is, the combination of transparent plates 601 and 602) remain approximately constant.

Figure 7B:
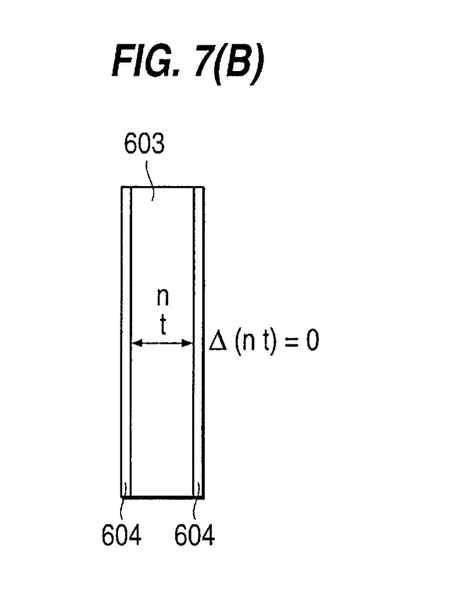
FIG. 7(B) is a diagram illustrating a Fabry-Perot etalon interferometer, according to a further embodiment of the present invention.

FIG. 7(B) is a diagram illustrating a Fabry-Perot etalon interferometer, according to a further embodiment of the present invention. Referring now to FIG. 7(B), a transparent plate 603 is made of a material that sets the change of the product of the thickness and refractive index to approximately zero. Reflecting films 604 are applied to both sides of transparent plate 603. Using a material that will not change in product of the thickness and refractive index n by the temperature change, a temperature-independent optical element can be formed without laminating a compensator to transparent plate 603.

In FIG. 7(A) transparent plate 602 is made of PMMA as a polymer. The PMMA has the thermal expansion coefficient of $7 \times 10^{-5}$ and a ratio of the refractive index change by temperature of $\Delta n/N=-7\times0^{-5}\sim15\times10^{-5}$. When $\Delta n/N$ is smaller than $-7\times10^{-5}$, the temperature change sets the product of the refractive index and thickness to a negative value.

Further, in FIG. 7(B), transparent plate 603 is made of PMMA as a polymer. For example, the ratio of the refractive index change by temperature for the PMMA is $-7\times10^{-5}$, the thermal expansion coefficient is $7\times10^{-5}$. As a result, the change of the products of the refractive index and thickness by the temperature change are offsets by each other and indicate approximately zero change.

Moreover, attaching a compensator having a larger thickness and a larger thermal expansion coefficient than a transparent plate enables the product of the thickness and refractive index to be constant in relation to changes in temperature.

The material to be used to prevent the product of the thickness and refractive index from being changed by temperature change can be selected from various common optical glasses. No special optical materials need to be developed, and a temperature-independent optical element is easily generated.

According to the above embodiments of the present invention, an optical element includes a transparent plate with reflecting films on opposite sides. A compensator is closely attached to at least one side of the transparent plate, and is made of a material different from that of the transparent plate. Moreover, the compensator has a larger thermal expansion coefficient than the transparent plate. With this configuration, a variation in the product of thickness and refractive index of the transparent plate, caused by a thermal change, is offset by transforming the transparent plate through a stretch made by the thermal change of the compensator. In this manner, the product of thickness and refractive index of the transparent plate is kept approximately constant.

Moreover, a rise in temperature causes the transparent plate to expand, and also increases the refractive index of the transparent plate. In addition, the compensator simultaneously expands with the expansion of the transparent plate. Since the thermal expansion coefficient of the compensator is larger than that of the transparent plate, the compensator expands more than the transparent plate. Thus, the compensator further stretches the transparent plate while expanding the transparent plate. The effect of the mechanical stretch reduces the thickness of the transparent plate through the Poisson ratio, and offsets the change in product of the thickness and refractive index of the transparent plate that changed with the rise of the temperature, thereby maintaining the product to be constant.

By contrast, when the temperature falls, the transparent plate shrinks and becomes thinner. However, the compensator shrinks more than the transparent plate to further shrink the transparent plate, and cause the transparent plate becomes thicker. As a result, the product of the thickness and refractive index of the transparent plate is kept approximately constant in response to the temperature change.

Moreover, as described above, a compensator can be attached to one or both sides of a transparent plate. As the temperature rises, the transparent plate 201 is expanded and pulled by the compensator. Thus, without an attached compensator, the thickness t of the transparent plate would become larger by thermal expansion of the transparent plate. However, the compensator causes the thickness t of the transparent plate to actually become smaller so that the product of the refractive index and the thickness t of the transparent plate is kept constant. Furthermore, the materials of the transparent plate and the compensator are selected from optical glasses to form the optical element such that the product of the refractive index and thickness t of the transparent plate can be maintained constant.

Although FIGS. 3(A), 3(B), 4(A), 4(B), 5(A), 5(B), 6(A), 6(B), 7(A) and 7(B) are described as being a Fabry-Perot etalon interferometer, these figures can also be considered to represent a VIPA. For example, in FIGS. 3(A) and 3(B), a VIPA would typically include an optic entrance window on one side of a respective reflecting film 202 with the reflectance of one reflecting film 202 set to 100% and that of the other reflecting film 202 set to 95%. Moreover, as described in more detail in U.S. patent application titled "VIRTUALLY IMAGED PHASED ARRAY AS A WAVELENGTH DEMULTIPLEXER", application Ser. No. 08/685,362, filed Jul. 24, 1996, and which is incorporated herein by reference, it is not always necessary to use an optic entrance window on a VIPA.

Moreover, the above embodiments of the present invention are described as relating to a Fabry-Perot etalon interferometer or a VIPA. However, the present invention is not intended to be limited to use with a Fabry-Perot etalon interferometer or a VIPA, and can be applied to many different optical elements.

Moreover, according to the above embodiments of the present invention, a compensator attached to the transparent plate can be transparent or opaque. For example, FIG. 3(A) illustrates the use of a transparent compensator, and FIG. 6(A) illustrates the use of an opaque compensator.

In the above embodiments of the present invention, a compensator is illustrated as a planar shaped object, such as a rectangle or a parallelopiped. However, the compensator is not intended to be limited to such shapes, and can be various shapes.

Figure 8:
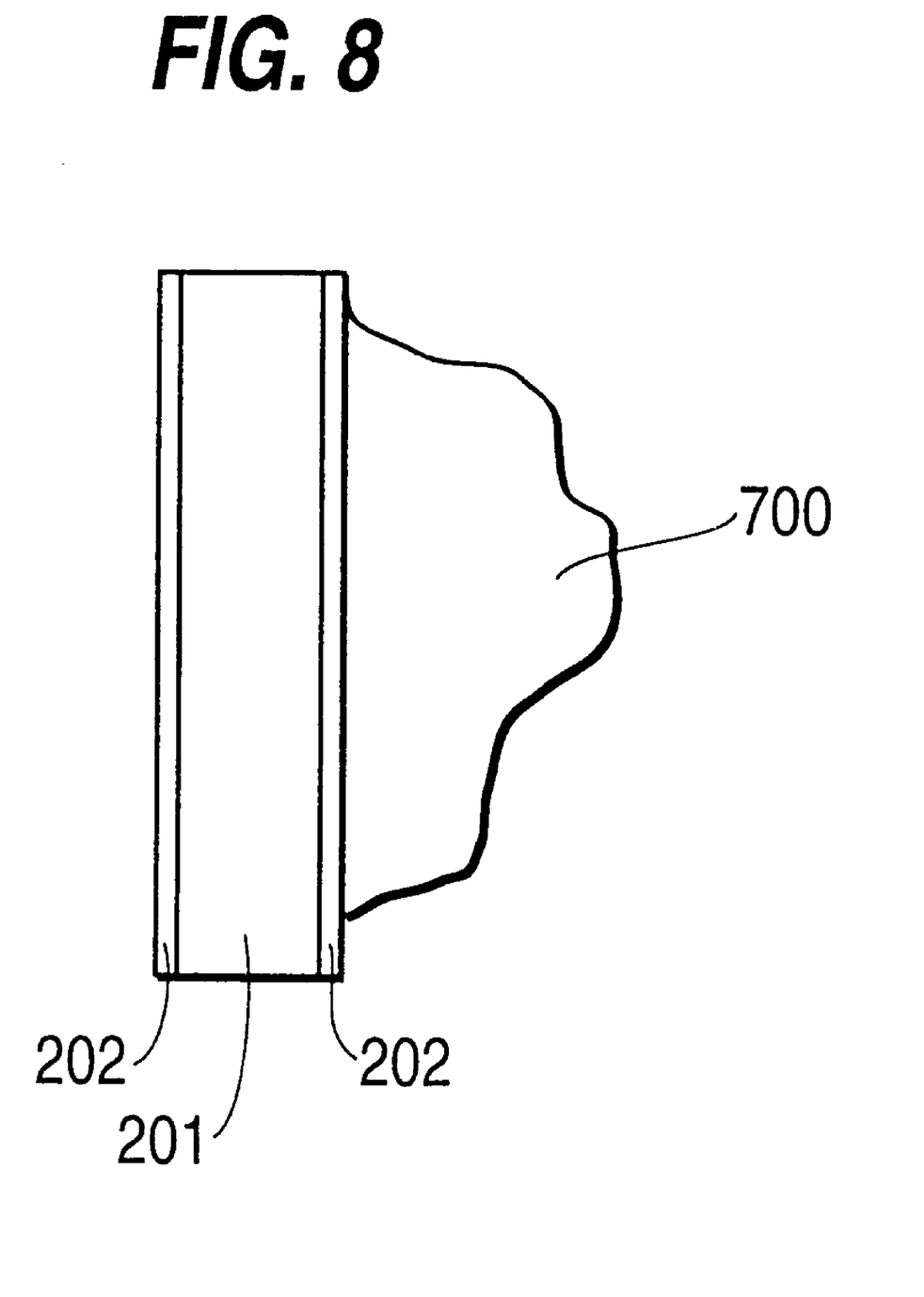
FIG. 8 is a diagram illustrating a compensator according to an embodiment of the present invention.

For example, FIG. 8 is a diagram illustrating a compensator according to an embodiment of the present invention. Referring now to FIG. 8, transparent plate 201 has an arbitrary shaped compensator 700 attached thereto. Such an arbitrary shaped compensator could easily be, for example, hemisphere shaped. However, the materials of transparent plate 201 and compensator 700 should be selected to have parameters which set Equation (2), above, to approximately zero.

Moreover, light is described herein as travelling through a "transparent plate" for an optical distance. However, the present invention is not intended to be limited to a "plate" shape. Virtually any size or shape material can be used, as long as light travels therethrough for an optical distance.

Further, a VIPA and a Fabry Perot etalon interferometer are described herein as having reflecting films with specific reflectances. However, the present invention is not intended to be limited to reflecting films with a specific reflectance. For example, a Fabry Perot etalon interferometer and a VIPA can be designed with many different types of reflectances.

According to the above embodiments of the present invention, the optical distance travelled through a transparent material is maintained to be approximately constant. For example, a compensator is attached to the transparent material and experiences thermal expansion which deforms the transparent material so that the optical distance is maintained to be approximately constant. Whether or not optical distance is considered to be "approximately" constant will, of course, depend on the specific use of the optical element. However, in a typical WDM system, a compensator would be considered to be maintaining the optical distance to be "approximately" constant if the deviation in the optical distance is maintained to be equal to, or less than, $1\times10^{-6}/$ °C. Although less preferable, a compensator in a typical WDM system would still be considered to be maintaining the optical distance to be "approximately" constant if the deviation in the optical distance is maintained to be equal to, or less than, $2 \times 10^{-6}$/°C.

A transparent material through which light travels is described herein as being a spacer in a Fabry-Perot etalon interferometer or a VIPA. However, a transparent material is not intended to be limited to such a spacer. Instead, the present invention can be applied to many different types of transparent materials with many different uses.

Further, a transparent material is described herein as having reflecting surfaces thereon. However, the present invention is not intended to be limited to the use of transparent materials having reflecting surfaces thereon. Instead, the present invention can be applied to many different types of optical waveguides which do not have reflecting surfaces thereon.

According to the above embodiments of the present invention, a compensator experiences "thermal expansion". "Thermal expansion" includes the physical expansion and the physical contraction of a substance. Generally, a physical contraction is referred to as a "negative" thermal expansion.

According to the above embodiments of the present invention, a transparent material through which light travels is described herein as being an optical glass. However, the transparent material is not intended to be limited to an optical glass, and other transparent materials can be used.

Therefore, according to the above embodiments of the present invention, an apparatus includes a transparent material and a compensator. Light travels through the transparent material for an optical distance. The compensator is attached to the transparent material and experiences thermal expansion which deforms the transparent material to reduce changes in the optical distance caused by changes in temperature of the transparent material. More specifically, the compensator deforms the transparent material by stretching the transparent material in directions transverse to the optical path travelled by the light through the transparent material, to thereby reduce the thickness of the transparent material in optical path direction.

Further, according to the above embodiments of the present invention, an apparatus includes first and second bodies. For example, referring to FIG. 3(A), transparent plate 201 can be considered to be a "first body", and compensator 203 can be considered to be a "second body". The first body is transparent so that light travels through the first body for an optical distance. The second body interacts with the first body to reduce changes in the optical distance caused by changes in temperature of the first body. The interaction is a "mechanical interaction", which indicates that a spatial change in one body affects another body.

Although a few preferred embodiments of the present invention have been shown and described, it would be appreciated by those skilled in the art that changes may be made in the embodiments without departing from the principles and spirit of the invention, the scope of which is defined in the claims and their equivalents.

What is claimed is:

1. An apparatus comprising:
   a transparent material through which light travels for an optical distance along an optical path extending in an optical path direction; and
   a compensator, in response to chances in temperature, experiencing thermal expansion which deforms the transparent material by stretching the transparent material in directions transverse to the optical path to thereby reduce the thickness of the transparent material in the optical path direction, to reduce changes in the optical distance caused by the changes in temperature.

2. An apparatus as in claim 1, wherein the compensator reduces changes in the optical distance so that the optical distance is maintained to be approximately constant.

3. An apparatus as in claim 1, further comprising:
   first and second reflecting surfaces on the transparent material, the light travelling from the first reflecting surface for the optical distance to reach the second reflecting surface.

4. An apparatus as in claim 1, wherein
   the optical path has a physical length,
   the transparent material has a refractive index, and
   the optical distance is defined as a product of the physical length of the optical path and the refractive index of the transparent material.

5. An apparatus as in claim 4, further comprising:
   first and second reflecting surfaces on the transparent material and separated from each other by the optical path.

6. An apparatus as in claim 1, further comprising:
   an adhesive which attaches the compensator to the transparent material.

7. An apparatus as in claim 6, wherein the adhesive is an optical adhesive.

8. An apparatus as in claim 1, further comprising:
   an attaching material which is transparent and attaches the compensator to the transparent material, wherein
   the compensator is transparent, and
   the light travels through the compensator, the attaching material and for the optical distance through the transparent material.

9. An apparatus as in claim 8, wherein the attaching material is an optical adhesive.

10. An apparatus as in claim 1, further comprising:
    an attaching material which attaches the compensator to the transparent material, wherein
    the compensator is transparent, and
    the light travels through the compensator and for the optical distance through the transparent material.

11. An apparatus as in claim 10, wherein
    a boundary exists between the compensator and the transparent material,
    the light crosses the boundary at a crossing point and travels for the optical distance through the transparent material, and
    the attaching material is at the boundary to attach the compensator to the transparent material, but does not exist at the crossing point of the boundary, to thereby provide an opening at the boundary through which the light can pass.

12. An apparatus as in claim 11, wherein the attaching material is selected from the group consisting of a metal and an adhesive.

13. An apparatus as in claim 1, wherein the compensator is welded to the transparent material.

14. An apparatus as in claim 4, wherein
    the transparent material has a thickness in the optical path direction,
    the compensator has a thickness in the optical path direction, and
    said thickness of the compensator is at least five times greater than said thickness of the transparent material.

15. An apparatus as in claim 4, wherein the compensator is a planar shaped object attached to the transparent material.

16. An apparatus as in claim 3, wherein the transparent material and the first and second reflecting surfaces together form one of the group consisting of a Fabry-Perot etalon interferometer and a virtually imaged phased array (VIPA).

17. An apparatus as in claim 1, wherein the transparent material is optical glass.

18. An apparatus as in claim 1, wherein the compensator is optical glass.

19. An apparatus as in claim 3, wherein the compensator is transparent and is positioned between the first and second reflecting surfaces so that the light travels from the first reflecting surface to the second reflecting surface by travelling through the compensator and for the optical distance through the transparent material.

20. An apparatus as in claim 4, wherein
the transparent material has a thickness in the optical path direction within the range of 10 $\mu$m to 5 mm,
the compensator has a thickness in the optical path direction within the range of 100 $\mu$m to 5 cm.

21. An apparatus as in claim 3, wherein the compensator deforms the transparent material so that, for changes in temperature of the transparent material, $$\frac{\Delta n}{n} + \frac{\Delta t}{t} \approx 0$$

where n is the refractive index of the transparent material, and the transparent material separates the first and second reflecting surfaces by a separation distance t.

22. An apparatus comprising:
a transparent material having an optical path extending therein in an optical path direction, the transparent material having a refractive index, the optical path having a physical length, and an optical distance being defined as a product of the physical length of the optical path and the refractive index of the transparent material;
first and second reflecting surfaces on the transparent material, light travelling from the first reflecting surface and through the transparent material along the optical path to reach the second reflecting surface, and
a compensator attached to the transparent material and in response to changes in temperature, experiencing thermal expansion which deforms the transparent material by stretching the transparent material in directions transverse to the optical path to thereby reduce the thickness of the transparent material in the optical path direction, to reduce changes in the optical distance caused by the changes in temperature.

23. An apparatus as in claim 22, wherein the compensator reduces changes in the optical distance so that the optical distance is maintained to be approximately constant.

24. An apparatus as in claim 22, wherein
the transparent material has first and second planar surfaces facing each other, the first reflecting surface being on the first planar surface and the second reflecting surface being on the second planar surface, and
the compensator has a planar surface attached to one of the group consisting of the first planar surface of the planar object and the second planar surface of the planar object.

25. An apparatus as in claim 22, wherein the compensator deforms the transparent material so that, for changes in temperature of the transparent material, $$\frac{\Delta n}{n} + \frac{\Delta t}{t} \approx 0$$

where n is the refractive index of the transparent material, and the transparent material separates the first and second reflecting surfaces by a separation distance t.

26. An apparatus:
first and second transparent bodies, light travelling through the first transparent body for a first optical distance and then travelling through the second transparent body for a second optical distance, wherein
the second optical distance changes to compensate for changes in the first optical distance caused by changes in temperature of the first transparent body, so that the sum of the first and second optical distances remains approximately constant, and
neither of the first and second transparent bodies is air.

27. An apparatus as in claim 26, further comprising:
first and second reflecting surfaces, the first and second transparent bodies being between the first and second reflecting surfaces so that the light travels from the first reflecting surface through the first transparent body for the first optical distance, through the second transparent body for the second optical distance, and to the second reflecting body.

28. An apparatus comprising:
a first body being transparent and through which light travels for an optical distance; and
a second body which interacts with the first body by stretching the first body in directions transverse to a travel direction of the light to thereby reduce the thickness of the first body in the travel direction of the light, to reduce changes in the optical distance caused by changes in temperature of the first body.

29. An apparatus as in claim 28, further comprising:
first and second reflecting surfaces on the first body, the light travelling from the first reflecting surface for the optical distance to reach the second reflecting surface.

30. An apparatus as in claim 28, wherein the second body interacts with the first body via mechanical interaction.

31. An apparatus as in claim 30, wherein the mechanical interaction is caused by thermal expansion of the first and second bodies.

32. A method comprising the steps of:
causing light to travel through a transparent material for an optical distance along an optical path extending in an optical path direction; and
deforming the transparent material by stretching the transparent material in directions transverse to the optical path to thereby reduce the thickness of the transparent material in the optical path direction, to reduce changes in the optical distance caused by changes in temperature of the transparent material.

33. A method as in claim 32, wherein the step of deforming comprises:
deforming the transparent material to maintain the optical distance to be approximately constant.

34. A method as in claim 32, wherein
the optical path has a physical length,
the transparent material has a refractive index, and
the optical distance is defined as a product of the physical length of the optical path and the refractive index of the transparent material.

* * * * *